United States Patent
Arai

[15] 3,703,702
[45] Nov. 21, 1972

[54] AIR BAG SAFETY DEVICE FOR VEHICLE PASSENGERS

[72] Inventor: Hiroshi Arai, Toyota, Japan

[73] Assignee: Toyota Jidosha Kogyo Kabushiki Kaisha, Toyota-shi, Japan

[22] Filed: May 7, 1971

[21] Appl. No.: 141,155

[30] Foreign Application Priority Data

Nov. 16, 1970 Japan..................45/100160

[52] U.S. Cl.............340/52 R, 180/98, 280/150 AB, 343/8
[51] Int. Cl..............................................B60r 21/06
[58] Field of Search ....180/82, 98, 103; 280/150 AB; 297/216, 217; 340/31, 52 R, 58, 62, 258 A, 410; 343/8

[56] References Cited

UNITED STATES PATENTS

| | | |
|---|---|---|
| 3,419,864 | 12/1968 | Lewis..........................343/8 |
| 3,420,572 | 1/1969 | Bisland..................297/217 X |
| 3,474,444 | 10/1969 | Okamoto..................180/98 X |
| 3,622,974 | 11/1971 | Best et al.............280/150 AB |

Primary Examiner—Kenneth H. Betts
Assistant Examiner—George Steube
Attorney—Toren & McGeady

[57] ABSTRACT

The disclosure concerns a safety device for a vehicle wherein a Doppler transmitter-receiver apparatus mounted on the vehicle and transmitting and receiving radiation from objects in the path of the vehicle forms a safety signal when the vehicle is about to crash into an object. The safety signal actuates a protective apparatus which blows up an air bag to restrain passengers in the vehicle. To test the safety device, a manual switch causes the transmitter-receiver apparatus to transmit radiation toward the vehicle's radiator fan as the latter moves toward the radiation. The switch directs the resulting safety signal to energize an indicator lamp that shows the system to be operational.

17 Claims, 2 Drawing Figures

INVENTOR.
HIROSHI ARAI
BY
Toren and McGeady

AIR BAG SAFETY DEVICE FOR VEHICLE PASSENGERS

SUMMARY OF THE INVENTION

This invention relates to a safety device for vehicle passengers in which an air bag is inflated by detecting the imminence of a vehicle collision in advance of the occurrence of the collision, thus preventing injuries to the vehicle passengers, and more particularly, to a mechanism for checking the overall operation of such safety devices.

When a moving vehicle collides with another vehicle or with an obstacle in its path, an occupant of the vehicle is thrown forward by his own inertia and strikes a portion of the vehicle. As a result, the occupant can be seriously injured. In order to protect the safety of vehicle occupants in the event of a collision, a known prior art system utilizes an air bag positioned at a location, which a vehicle occupant is most likely to strike, and adapted to be inflated upon the occurrence of a collision. This protects the safety of the vehicle occupant elastically. In this safety device for vehicle passengers, described in detail later, the Doppler effect on an electromagnetic wave is used to detect the imminence of a collision between a vehicle and an object in its path. The device uses collision detecting and calculating circuit composed of an electromagnetic wave transmitting-receiving and mixing unit and a Doppler signal calculating unit, thus rapidly inflating an air bag by means of a gas inflating means comprising an air bag actuating unit. In order to obtain the above-described effect, the safety device for vehicle passengers of the type described above must be manufactured very precisely. Moreover, a high degree of reliability in operation is required. Consequently, it is necessary to maintain the reliability of all component parts. Furthermore, error appears easily in the device described, because it is used in vehicles or the like which are always subject to vibration. Consequently, it is desirable that the performance of the overall device be able to be checked at any time.

An object of this invention is to provide a means for easily checking the operation of a safety device for vehicle passengers, except a gas inflating means thereof in which gas for the inflation of air bag is consumed, by developing a simulated crash condition within a vehicle itself.

Another object of this invention is to provide a means for easily developing a simulated crash condition within a vehicle itself by utilizing a certain component part of the vehicle which make relative motion.

In safety devices for vehicle passengers of the type wherein a potential collision between a vehicle and an object in its path is detected by means of a collision detecting and calculating circuit by radiating the electromagnetic wave from the vehicle to the object and receiving the reflected wave having the Doppler-shifted frequency and an air bag of a gas inflating means is inflated upon the reception of an actuating signal derived from said circuit, this invention resides in the provision of an operation checking mechanism comprising an electromagnetic wave transmitting-receiving antenna provided at a location opposite to a component part of the vehicle itself which executes a motion relative to the vehicle so as to develop a simulated crash condition, a switch means provided between said collision detecting and calculating circuit and said gas inflating means and adapted to disconnect the electrical connection so as not to actuate said gas inflating means at the time of checking the operation by developing the simulated crash condition, and indicating means provided so that the indicating means or said gas inflating means is selectively connected by means of said switch means thereby to indicate the result of the operation check of the safety device due to the simulated crash condition, said simulated crash condition being developed within a vehicle by the operation of said switch means, thus making it possible to check the performance of the safety device for vehicle passengers at any time.

Other features and advantages of the invention will become apparent when referring to the following description taken in conjugation with the accompanying drawings.

DESCRIPTION OF A PREFERRED EMBODIMENT

First, the principle of a safety device for vehicle passengers is described. When an undulatory signal, such as electromagnet waves, having the frequency $f_1$ is radiated from a moving vehicle toward an object in the vehicle path, the wave reflected from the object is subject to a frequency shift due to the Doppler effect. The frequency $f_2$ of the signal reflected from the object may be expressed by the following equation in which the relative velocity between a vehicle and an object is $v$ and the signal propagation speed is $c$:

$$f_2 = (c+v)/(c-v) \cdot f_1$$

From this equation, the difference frequency $f_d$ between the frequencies $f_1$ and $f_2$, hereinafter referred to as "Doppler signal frequency," may be determined as follows:

$$f_d = f_2 - f_1 \approx (2v/c) \cdot f_1$$

Since the propagation speed c and the frequency $f_1$ of the radiated signal are known in advance, the frequency $f_d$ of the Doppler signal can be obtained as a value proportional to the relative velocity between a vehicle and an object in its path. Thus, the frequency $f_d$ may be expressed as follows in which $k_1$ is the proportionality constant:

$$f_d = k_1 \cdot v$$

On the other hand, it is generally held that the level G of the Doppler signal is inversely proportional to the fourth power of the distance when the distance is large, and that it is inversely proportional to the cube or square of the distance as the distance decreases. It has been confirmed from experiments that the level G of the Doppler signal is almost inversely proportional to the distance if the distance is quite short (less than 10 meters), which is the distance with which this invention is chiefly concerned. The relation between the level G of the Doppler signal and the distance D is determined by the following equation:

$$G = k_2/D$$

where $k_2$ is the proportionality constant.

The product S of the frequency $f_d$ of the Doppler signal proportional to the relative velocity $v$ and the level G of the Doppler signal inversely proportional to the distance D is determined as follows:

$$S = f_d \cdot G = k_1 \cdot k_2 \cdot (v/D) = k \cdot (1/T)$$

where $k$ is a constant and T is the time remaining until the occurrence of a collision if the vehicle continues to approach an obstacle in its path at the relative velocity $v$. When the product S exceeds the specified value, the remaining time T is decreased to less than the specified value. This remaining time may be selected as a value necessary for the inflation of an air bag in advance of the occurrence of a collision. Thus, the time remaining until the occurrence of a collision is detected in advance and an air bag is inflated before injuries are inflicted to a vehicle occupant, thereby to protect the safety of vehicle occupants.

An embodiment of the above-described safety device for vehicle passengers is described with reference to the accompanying drawings.

Figure 1:
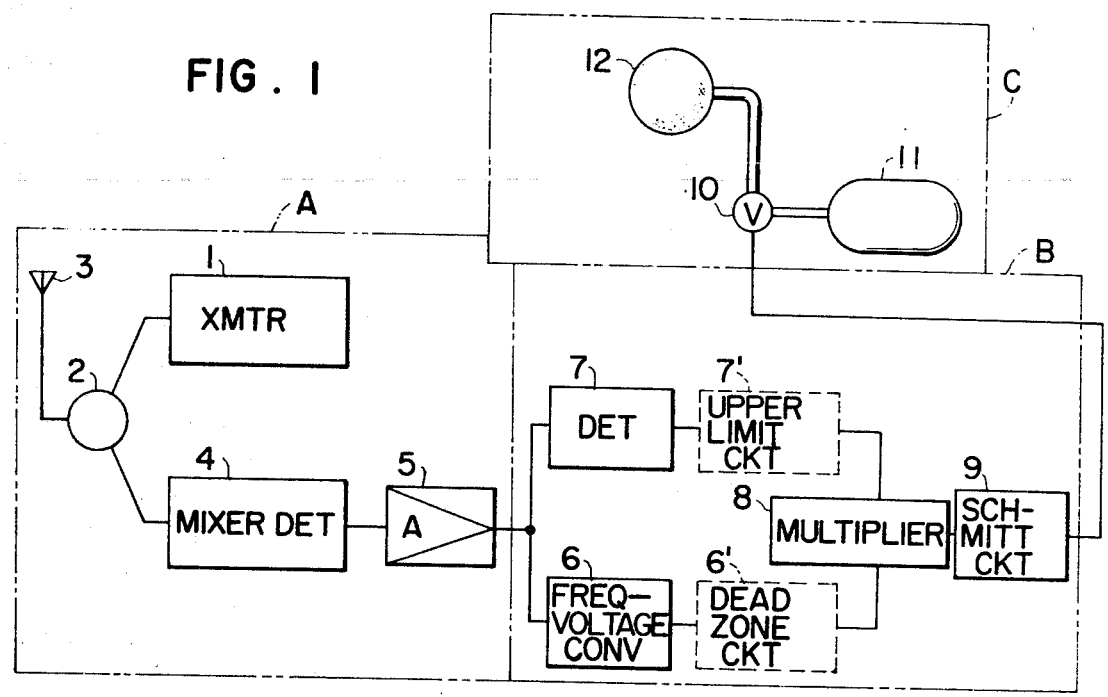
FIG. 1 is a schematic block diagram of a safety device for vehicle passengers to which the operation checking mechanism according to this invention is applied.

In FIG. 1, the safety device for vehicle passengers comprises an electromagnetic wave transmitting-receiving and mixing unit A and a Doppler signal calculating circuit B of a collision detecting and calculating circuit, and also comprises an air bag actuating unit C of a gas inflating means. The electromagnetic wave transmitting-receiving and mixing unit A comprises an electromagnetic wave transmitter 1, a directional coupler 2, a transmitting-receiving antenna 3, a mixer-detector 4 and an amplifier 5. The electromagnetic wave derived from the transmitter 1 through the coupler 2 is radiated from the antenna 3. The antenna 3 has a directivity, suitable for radiating the electromagnetic wave along a specific beam width and picks up the wave reflected from an object in the vehicle path. The mixer-detector 4 mixes the radiated wave with the reflected wave to derive a Doppler signal exhibiting the difference frequency between the frequencies of said both waves, which is then amplified to a desired value by the amplifier 5.

The Doppler signal calculating unit B comprises a frequency voltage converter 6, a detector 7, a multiplier 8 and a Schmitt circuit 9. The amplified frequency $f_d$ of the Doppler signal is converted to a quantity of electricity $v_1$, i.e. a DC voltage, by means of the frequency-voltage converter 6. A second quantity of electricity $v_2$, i.e. a DC voltage which is proportional to the level G, is obtained from the Doppler signal by means of the detector 7. The multiplier 8 multiplies the two quantities of electricity $v_1$ and $v_2$ and derives a quantity of electricity $v_3$ which is proportional to the product S. A predetermined actuating signal is issued from the Schmitt circuit 9 when the quantity of electricity $v_3$ exceeds a certain value.

The air bag actuating unit C comprises a valve 10, a non-combustible gas container 11 and an air bag 12. Upon receiving the actuating signal from the Schmitt circuit 9, the valve 10 opens to deliver gas from the container 11 into the air bag 12 to inflate it, thus preventing the contact of a vehicle occupant with the vehicle body.

The safety device for vehicle passengers detects a potential collision on the above-described principle. The actuating signal is produced by the Schmitt circuit 9 at a time when the air bag 12 can be inflated well in advance of the occurrence of a collision. The remaining time T is usually selected in the range of 100 to 200 ms. Elements 6' and 7' shown in dotted lines in the Doppler signal calculating unit B are a dead zone circuit and an upper limit circuit, respectively. The circuit 6' limits the quantity of electricity $v_1$ or reduces it to almost zero in case when the relative velocity between a vehicle and an object is so low that no actual injury is incurred by a vehicle occupant even if a crash actually occurs. The circuit 7' limits the maximum value of the quantity of electricity $v_2$ when the distance between a vehicle and an object in its path is so small that the measurement is meaningless. In this way, erroneous or unwanted actuation of the safety device for vehicle passengers is prevented when the occurrence of an actual collision would result in no injury to vehicle passengers.

The mechanism for checking the operation of the safety device for vehicle passengers with which this invention is chiefly concerned will be described hereinbelow.

Figure 2:
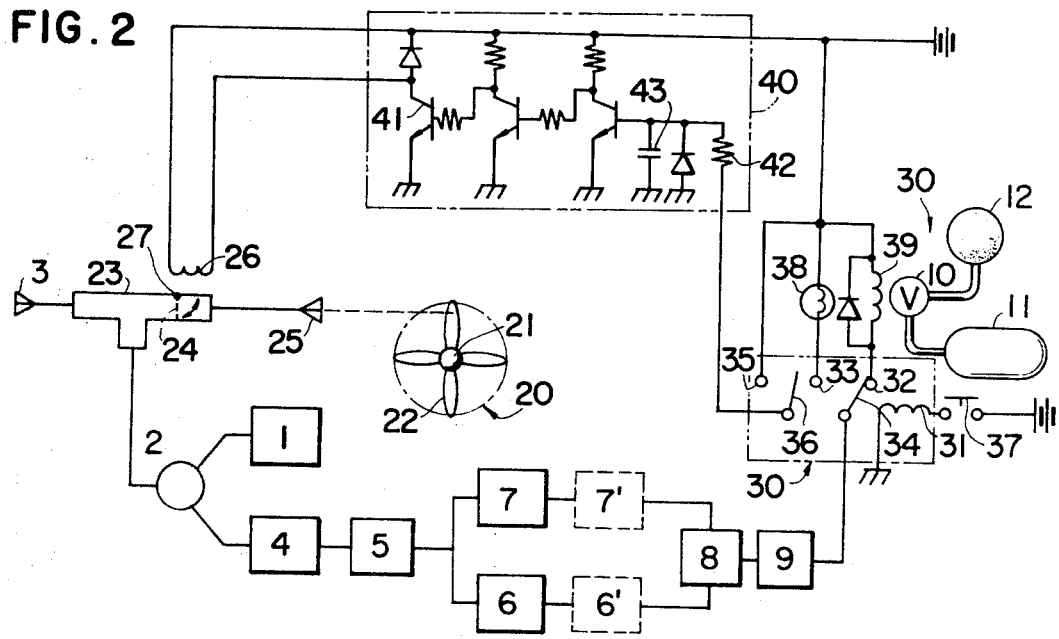
FIG. 2 is a circuit diagram of the operation checking mechanism embodying features of this invention, combined with the schematic block diagram of the safety device for vehicle passengers.

Referring now to FIG. 2, among component parts of a vehicle itself, an engine cooling fan 20 is utilized as a part which executes relative motion so that a simulated crash condition is developed. A shaft 21 of the fan 20 is connected to a crank shaft (not shown) and is provided with a plurality of vanes 22. By way of example, let the number of vanes 22 be four, the radius 20 cm, the rotational speed of the crank shaft 500 rpm. Moreover, let the ratio of revolutions of the crank shaft and the fan shaft 21 be 1:1.2. In this case, the peripheral speed of the vane 22 will be approximately 45 km/h. This means that an object having the speed of 45 km/h is approaching and leaving 40 times per second. Therefore, when the electromagnetic wave is radiated to the fan 20, the Doppler-shifted reflected wave is obtained. In the electromagnetic wave transmitting-receiving and mixing unit A, a T-shaped branch path 23 is provided in the electric circuit between the directional coupler 2 and the electromagnetic wave transmitting-receiving antenna 3. An electromagnetic wave shutter 24 is attached to one side of said branch path 23, which performs the opening and closing operations. An transmitting-receiving antenna 25 for simulated crash operation is connected to the shutter 24. Said antenna 25 is provided near the fan 20 so that the directivity thereof coincides with the tip of the vane 22. The electromagnetic wave shutter 24 of the T-shaped branch path 23 is opened or closed by 90 degrees around a shaft 27 by means of a rotary solenoid 26. When the shutter 24 is held closed as illustrated, the coupler 2 is electromagnetically cut off from the transmitting-receiving antenna 25. In the T-shaped branch path 23, the electromagnetic wave shutter 24 is provided at a location where no reflected wave is produced from the shutter 24 but a standing wave is produced at the shutter side off the center of the T-shaped branch path 23. Thus, when a simulated crash condition is developed, the electromagnetic wave shutter 24 of the T-shaped branch path 23 is opened by the rotary solenoid 26 to radiate the electromagnetic wave from the antenna 25 to the fan 20. At the same time, the antenna 25 picks up the reflected wave having the doppler-shifted frequency.

A change-over switch 30 is provided between the Schmitt circuit 9 of the Doppler signal calculating unit B and the valve 10 of the air bag actuating unit C. The change-over switch 30 comprises a relay coil 31, a first contactor 34 which closes two contacts 32 and 33 selectively, and a second contactor 36 which makes and breaks a contact 35. The relay coil 31 is connected to the power source through a manual switch 37 for checking the operation of a safety device which is provided at the driver's seat or other locations. The first contactor 34 is connected to the Schmitt circuit 9 of the safety device for the vehicle passengers. One of two contacts 32 and 33 is connected to a solenoid 39 which is adapted to actuate the valve 10. The other contact 33 is connected in parallel with the solenoid 39 to a lamp 38 for confirming the operation of the safety device at the time of simulated crash. The second contactor 36 and the contact 35 thereof are connected between the operation checking lamp 38 and a delay circuit 40 which is described hereafter. The first contactor 34 of the change-over switch 30 is normally in contact with the contact 32. The second contactor 36 is normally held opened. When the relay coil 31 is excited by the depression of the manual switch 37, two contactors 34 and 36 are simultaneously changed over. Thus, the former is brought into contact with the contact 33 to cut off the connection between the Schmitt circuit 9 and the valve 10 of the air bag actuating unit C. The latter contactor 36 closes the contact 35 so as to connect it to the delay circuit 40.

The delay circuit 40 is provided between the rotary solenoid 26 of the electromagnetic wave shutter 24 and the second contactor 36 and the contact 35 of the change-over switch 30. The delay circuit 40 comprises a driving transistor 41 to be connected to the rotary solenoid 26, a resistor 42 for obtaining delay time which is connected to the second contactor 36, a capacitor 43 and other elements. When the manual switch 37 is depressed to start the checking operation of the performance of the safety device for vehicle passengers, the rotary solenoid 26 is excited to open the electromagnetic wave shutter 24 after the elapse of a predetermined period from the time the manual switch 37 is turned on. Thus, when the manual switch 37 is turned on, the opening operation of the electromagnetic wave shutter 24 by the rotary solenoid 26 takes place earlier than the change-over operation of the first contactor 34 of the change-over switch 30, and therefore the consumption of gas due to erroneous actuation of the air bag actuating unit C at the time of simulated crash operation can be prevented.

The operation of the safety device for vehicle passengers of the above-described construction will be described hereinbelow.

In the case of usual collision detection, all lines of the safety device for vehicle passengers are put into waiting conditions when the engine is started. The manual switch 37 is in the OFF position. Consequently, the first contactor 34 of the change-over switch 30 is in contact with the contact 32, thus connecting the Schmitt circuit 9 of the device for vehicle passengers to the solenoid 39 of the valve 10. The second contactor 36 and the contact 35 are opened to drive the transistor 41 of the delay circuit 40 into non-operation and to demagnetize the rotary solenoid 26. As a result, the electromagnetic wave shutter 24 of the T-shaped branch path 23 is brought into the cut-off condition. Consequently, no electromagnetic wave is radiated from the transmitting-receiving antenna 25 for simulated crash operation. The electromagnetic wave is transmitted and received by the antenna 3 only. When an actual crash condition is met, the safety device for vehicle passengers calculates for the detection of a potential collision and issues the actuating signal in the manner described above. When the actuating signal is issued, the solenoid 39 is excited to open the valve 10 and to deliver gas from the container 11 into the air bag 12 to inflate it, regardless of the operation checking mechanism according to this invention.

On the other hand, when performing the confirmation and checking of the operation of the safety device before the vehicle starts to move, the manual switch 37 is held in the ON position for an arbitrary period of time after the engine is started. Consequently, the first contactor 34 of the change-over switch 30 is changed over to the contact 33 to connect the Schmitt circuit 9 to the operation checking lamp 38. At the same time, the second contactor 36 closes the contact 35 to connect the delay circuit 40 thereto. When the operation of the change-over switch is completed a predetermined period of time after the manual switch 37 is turned on, the transistor 41 of the delay circuit 40 conducts and the electromagnetic shutter 24 is opened by the rotary solenoid 26. As a result, the electromagnetic wave from the directional coupler 2 branches at the T-shaped branch path 23 and is simultaneously radiated from both antennas 3 and 25. However, since no wave is reflected to the antenna 3 and the fan 20 with its relative motion is provided within the directivity of other antenna 25, the reflected wave having a Dopper-shifted frequency is received by the antenna 25 to develop a simulated crash condition. Thus, the detection of a potential collision is accomplished by the collision detecting circuit of the safety device for vehicle passengers in conformity with the thus developed simulated crash condition. The result of the checking operation is indicated by illumination of the operation checking lamp 38 due to the actuating signal instead of the actuation of the solenoid 39. At this time, a trouble in the safety device for vehicle passengers is detected by the failure of the operation checking lamp 38 to burn.

As described above, the safety device for vehicle passengers according to this invention is adapted to confirm and inspect the operation of the safety device for vehicle passengers by developing a simulated crash condition within a vehicle. Therefore, the checking results agree with the conditions of actual crashes with almost 100 percent reliability. Moreover, because a simulated crash condition is developed by using an engine cooling fan which is a component part of a vehicle, extra operation checking means are not required. Therefore, this invention is structurally advantageous. Moreover, the air bag actuating unit of the safety device for vehicle passengers is separated by means of a switching means at the time of operation check, and therefore the consumption of gas at the time of the inspection can be avoided. Additionally, the operation checking mechanism is provided separately from the safety device for vehicle passengers and is easily inspected by means of a switch located at the driver's seat or other location. Since the operation checking mechanism is installed in a vehicle body, inspection of the operation of safety device can be accomplished at any time in any place.

Many modifications and variations of the device described may be easily effected. For example, the manual switch 37 of the operation checking mechanism may be modified to be automatic. The operation checking lamp 38 may be replaced with other alarm means. Moreover, the engine cooling fan 20 may be replaced with any other means which executes relative motion to develop a simulated crash. The construction of the T-shaped branch path 23 may be appropriately modified.

While embodiments of the invention have been described in detail, it will be obvious to those skilled in the art that the invention may be embodied otherwise.

What is claimed is:

1. In a vehicle having a moving part, a safety device for responding to the imminence of a crash between the vehicle and an object, comprising electromagnetic transmitter-receiver means mounted on the vehicle for transmitting electromagnetic radiation from the vehicle and sensing radiation reflected from the object, Doppler sensing means coupled to said transmitter-receiver means for producing a signal when the sensing means senses that a crash is imminent, collision protecting means in the vehicle actuable to furnish resilient protection to passengers in the vehicle in response to the signal, indicator means actuable by the signal for exhibiting one state when actuated by the signal and another state when not subject to actuation by the signal, said receiver-transmitter means being capable of transmitting electromagnetic energy toward and being responsive to energy from the moving part, and switch means alternately coupling said sensing means to said protecting means and said indicator means and coupled to said transmitter-receiver means for alternately rendering said indicator means responsive to said protecting means and said sensing means and resndering said transmitter-receiver means responsive to reflected energy from the moving part.

2. A device as in claim 1, wherein said transmitter-receiver means includes first radiation means for radiating and sensing the energy from the object and second radiation means for radiating and sensing energy from the moving part.

3. A device as in claim 1, wherein the vehicle has a cooling fan and wherein the moving part toward which the transmitter-receiver means radiates the energy is the cooling fan.

4. A device as in claim 3, wherein said transmitter-receiver means includes first radiating means for radiating and sensing the energy from the object and second radiating means for radiating and sensing the energy from the fan.

5. A device as in claim 1, wherein said switch means is manual and assumes an unactuated position in which the sensing means is coupled to the protecting means and the signal actuates the protecting means, and wherein said switch means in its actuated position couples said sensing means to said indicator means and renders said transmitter-receiver means responsive to reflected energy from the moving part.

6. A device as in claim 2, wherein said switch means is manual and assumes an unactuated position in which the sensing means is coupled to the protecting means and the signal actuates the protecting means, and wherein said switch means in its actuated position couples said sensing means to said indicator means and renders said transmitter-receiver means responsive to reflected energy from the fan.

7. A device as in claim 1, wherein said switch means includes delay means for delaying the rendering of the transmitter means responsive to radiation from the moving part a predetermined time after rendering the indicator means responsive to the signal from said sensing means.

8. A device as in claim 2, wherein said switch means renders the second radiation means inactive when said protecting means responds to the signal, and wherein said switch means includes delay means for delaying the rendering of the second radiation means responsive to radiation from the moving part a predetermined time after rendering said indicator means responsive to the signal.

9. An apparatus as in claim 5, wherein said switch means includes a solenoid, and manual means for actuating the solenoid.

10. A vehicle, comprising a moving part, electromagnetic transmitter-receiver means mounted for transmitting electromagnetic radiation from the vehicle and sensing reflected radiation, Doppler sensing means coupled to said transmitter-receiver means for producing a signal when the sensing means determines that a crash is imminent, collision protecting means actuable to furnish resilient protection to passengers in the vehicle in response to the signal, indicating means actuable by the signal for exhibiting one state when actuated by the signal and another state when not subject to actuation by the signal, said receiver-transmitter means being capable of transmitting electromagnetic energy toward and being responsive to energy from the moving part, and switch means alternately coupling said sensing means to said protecting means and said indicating means and coupled to said transmitter-receiver means for alternately rendering said indicating means responsive to said protecting means and said sensing means and rendering said transmitter-receiver means responsive to reflected energy from the moving part.

11. A vehicle as in claim 10, wherein said transmitter-receiver means includes first radiation means for radiating and sensing the energy from the object and second radiation means for radiating and sensing energy from the moving part.

12. A vehicle as in claim 10, wherein said moving part includes a fan, and wherein said transmitter-receiver means radiates energy toward the fan and at least a portion of the fan moves toward the oncoming radiation.

13. A vehicle as in claim 12, wherein said transmitter-receiver means includes first radiation means for radiating and sensing the energy from the object and second radiation means for radiating and sensing energy from the moving part.

14. A vehicle as in claim 10, wherein said switch means is manual and assumes an unactuated position in which the sensing means is coupled to the protecting means and the signal actuates the protecting means, and wherein said switch means in is actuated position couples said sensing means to said indicating means and renders said transmitter-receiver means responsive to reflected energy from the moving part.

15. A vehicle as in claim 10, wherein said switch means includes delay means for delaying the rendering of the transmitter means responsive to radiation from the moving part a predetermined time after rendering the indicating means responsive to the signal from said sensing means.

16. A vehicle as in claim 10, wherein said protecting means includes an inflatable gas bag and wherein said protecting means responds to the signal by inflating the gas bag.

17. In safety devices for protecting vehicle passengers wherein a potential collision between a vehicle and an object in its path is detected by means of a collision detecting and calculating circuit by radiating electromagnetic waves from the vehicle to the object and receiving the reflected waves having a Doppler shift and an air bag is gas-inflated upon receiving an actuating signal from the circuit, and wherein the vehicle includes a component part that moves relative to the vehicle, an operation-checking mechanism comprising an electromagnetic wave transmitting-receiving antenna located opposite to the component part so that the component part moves toward the antenna, switch means between the collision detecting and calculating circuit and said gas-inflating means and adapted to disconnect the electrical connection so as to avoid actuating the gas-inflating means, and indicating means responsive to the switch means for responding to the circuit in lieu of the gas-inflating means, said collision detecting and calculating means being adapted to issue a collision detecting signal in response to the moving component part, whereby the performance of the safety device may be checked.

* * * * *